United States Patent [19]

Francklyn

[11] Patent Number: 4,869,014
[45] Date of Patent: * Sep. 26, 1989

[54] ADJUSTABLE BAIT-RECEIVING FISHING LURE

[76] Inventor: Gilbert W. Francklyn, Poulsbo, Wash.

[*] Notice: The portion of the term of this patent subsequent to Jan. 20, 2004 has been disclaimed.

[21] Appl. No.: 208,780

[22] Filed: Aug. 8, 1988

Related U.S. Application Data

[63] Continuation of Ser. No. 78,108, Jul. 27, 1987, Pat. No. 4,791,751.

[51] Int. Cl.$^4$ ............................................. H01K 83/06
[52] U.S. Cl. ................................... 43/44.6; 43/42.47; 43/42.49
[58] Field of Search ................. 43/43.13, 42.03, 42.22, 43/42.47, 42.29, 42.36, 42.09, 44.2, 44.4, 44.6, 42.49, 42.08

[56] References Cited

U.S. PATENT DOCUMENTS

| | | |
|---|---|---|
| 1,814,450 | 7/1941 | Nelson . |
| 2,152,275 | 3/1939 | Parkins ................................. 43/46 |
| 2,461,755 | 2/1949 | Miller ................................... 43/40 |
| 2,582,646 | 1/1952 | Moore ................................ 43/44.2 |
| 2,734,301 | 2/1956 | Fuqua ............................... 43/42.05 |
| 2,776,517 | 1/1957 | Borgstrom ........................ 43/42.22 |
| 2,892,281 | 6/1959 | Schilling et al. .................... 43/42.36 |
| 2,950,559 | 8/1960 | Nelson .............................. 43/42.02 |
| 2,986,838 | 6/1961 | Smyser .............................. 43/42.39 |
| 3,022,572 | 2/1962 | Kwisner ............................ 43/44.6 |
| 3,514,890 | 6/1970 | Francklyn ........................ 43/42.05 |
| 3,760,529 | 9/1973 | Hicks ................................. 43/41 |
| 3,879,881 | 4/1975 | Vick .................................... 43/41 |
| 3,914,896 | 10/1975 | Sahagian ........................... 43/44.6 |
| 4,133,132 | 1/1979 | Ellis et al. ............................ 43/41 |
| 4,215,507 | 8/1980 | Russell ............................. 43/42.22 |
| 4,445,294 | 5/1984 | Gowing ............................ 43/42.47 |
| 4,589,222 | 5/1986 | Barnhart .......................... 43/42.23 |

*Primary Examiner*—Richard K. Seidel
*Attorney, Agent, or Firm*—Christensen, O'Connor, Johnson & Kindness

[57] ABSTRACT

An adjustable bait-receiving fishing lure is disclosed for use in receiving baits of varying size and producing differing lure retrieval patterns. The bait-receiving includes a top section and bottom section that cooperatively engage the upper and lower forward portions of a bait. A diving lip controls the depth at which the lure is retrieved and provides a swimming action. A screw, passing through disc-like portions of the top piece, bottom piece, and diving lip allows the relative orientation of these components to be adjustably secured. In this manner, baits of varying size can be accommodated between the top and bottom sections, while the diving lip is adjusted to produce a desired lure retrieval pattern for the particular size of herring and trolling speed involved. To adjust the lure's action, the line is attached to the diving lip by a removable and rotatable, frictionally secured plug. By changing the orientation of the plug with respect to the diving lip, the point of connection between the line and lure varies, allowing the lure to traverse a helical pattern underneath the surface of the water.

3 Claims, 3 Drawing Sheets

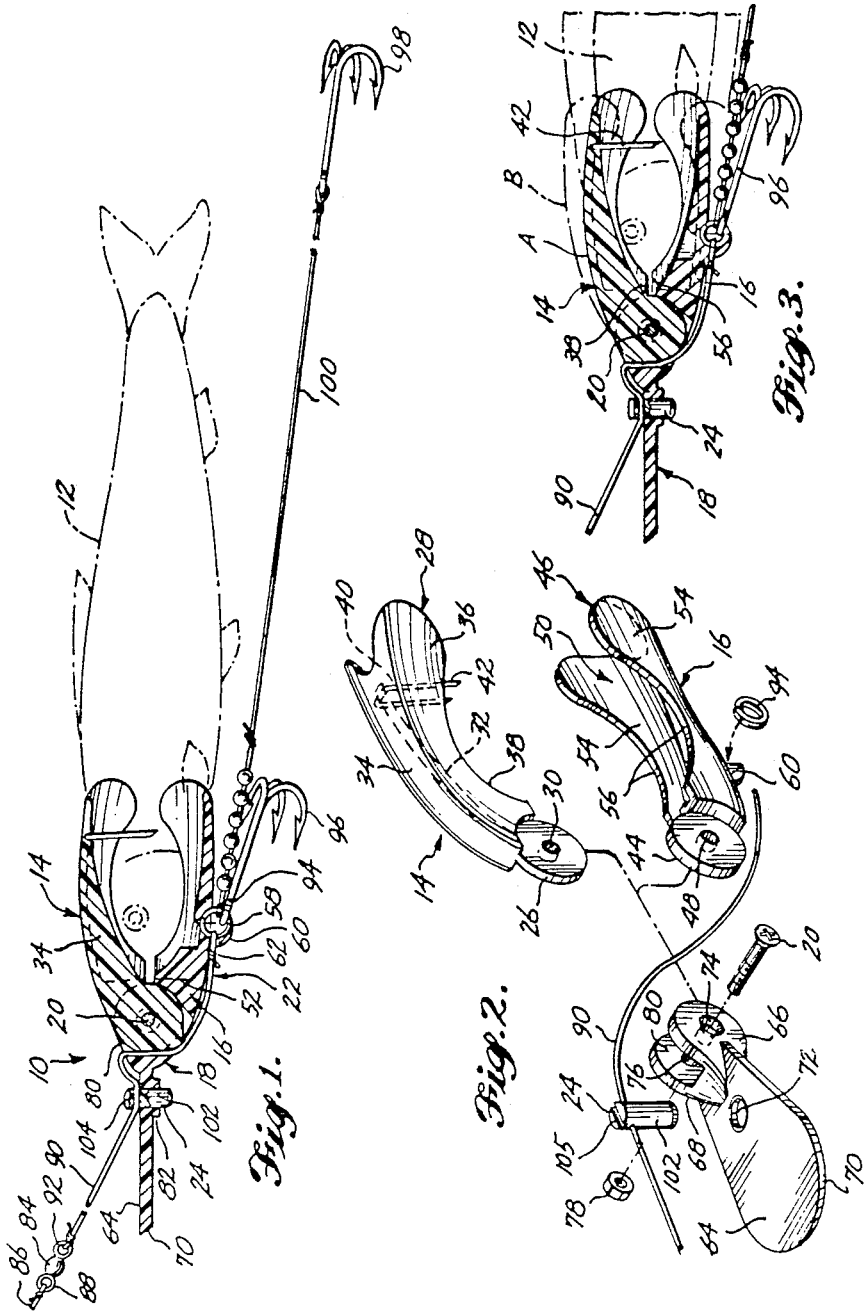

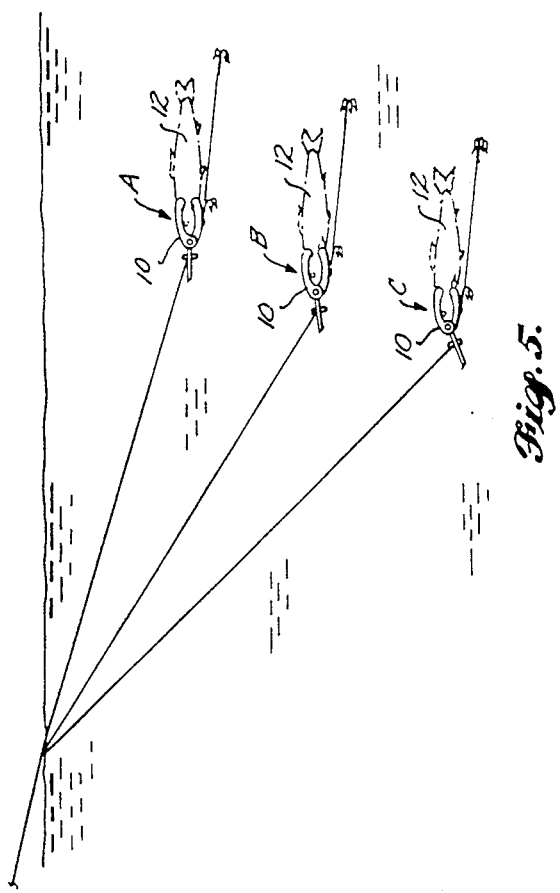
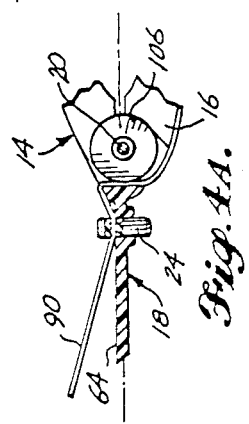
Fig. 4A.
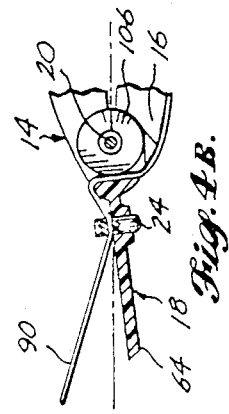
Fig. 4B.
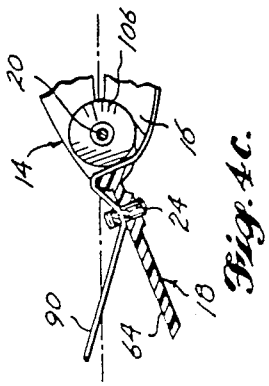
Fig. 4C.
Fig. 5.

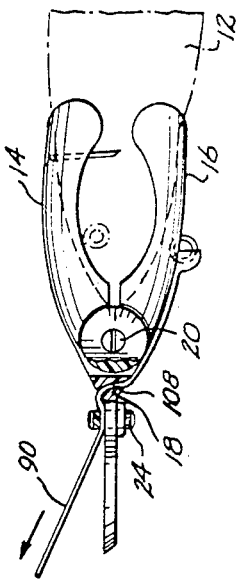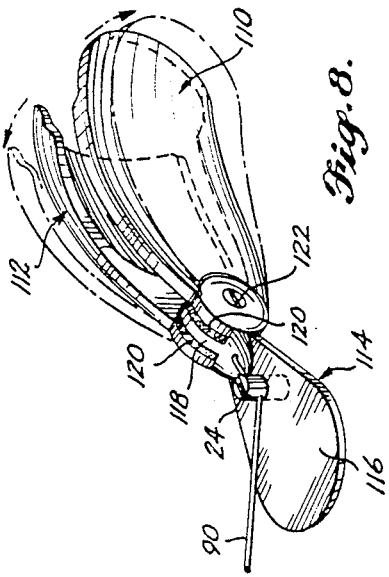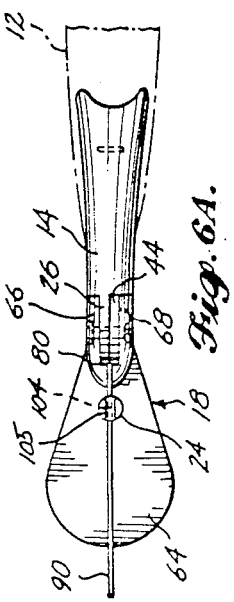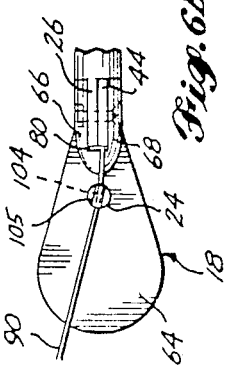

ADJUSTABLE BAIT-RECEIVING FISHING LURE

FIELD OF THE INVENTION

This is a continuation of application Serial No. 078,108, filed July 27, 1987, now U.S. Pat. No. 4,791,751 the benefit of the filing date of which is hereby claimed under 35 USC §120. This invention relates to fishing lures and, more particularly, to fishing lures for use with bait.

BACKGROUND OF THE INVENTION

Artificial lures have long been used to catch fish. While such lures typically ismulate the natural prey of the species of fish sought, they have a number of advantages over natural baits. For example, artificial lures are relatively durable and can be used repeatedly over long periods of time. Further, when drawn through the water by trolling or manual retrieval of the fishing line, artificial lures are often able to simulate the action of a natural bait in a manner that could not be accomplished wth the use of the bait alone. In addition, because artificial lures are available in a broad range of constructions and colorations, a particular lure can be selected to enhance the likelihood of catching fish in accordance with the existing conditions of water and weather, the size and species of fish sought, the bottom structure available, and the location of the fish with respect to the surface.

In spite of the foregoing advantages attributable to artificial fishing lures, certain desirable features of natural baits are difficult to incorporate into such lures. For example, the scent of a natural bait, such as a herring, is difficult to introduce and maintain in an artificial lure. Further, it is difficult to produce a fishing lure having the same texture or consistency as the natural bait simulated, a factor that may cause a fish to reject the lure before becoming hooked. In addition, the use of relatively soft artificial baits can be somewhat expensive, given the tendency of the bait to pull free of the hooks when a fish strikes and is being fought.

To achieve a combination of the advantages noted above, artificial lures have been designed for use with natural baits. Such lures, however, are typically only usable with a relatively limited range of bait sizes and do not adequately secure the bait. Further, while such lures may include some mechanism for controlling the lure's retrieval depth, or the particular bait action simulated, control over these features is typically quite limited.

In light of the foregoing observations, it would be desirable to provide an adjustable, bait-receiving fishing lure capable of producing a variety of retrieval patterns and for use with baits having a relatively wide range of sizes. In addition, because of the visual attraction of fish to natural baits, it would be desirable to maintain good visibility of the bait while holding it securely in place. Further, it would be desirable to produce a bait-receiving lure that has a minimal destructive impact on the bait.

SUMMARY OF THE INVENTION

In accordance with this invention, an adjustable fishing lure is disclosed for receiving baits of different sizes and, when attached to a fishing line and retrieved through water, for interacting with the water in various manners. The fishing lure includes first and second bait-contacting members for cooperatively engaging the bait. A lure guide member is also included to interact with the water through which the fishing lure is retrieved. An adjustable connector joins the first bait-contacting member, the second bait-contacting member, and the lure guide member. In this manner, the first and second bait-contacting members are allowed to cooperatively engage baits of different size and the interaction between the guide member and the water is allowed to vary.

In accordance with a particular aspect of this invention, the lure guide member includes a guide portion having a hole provided therethrough. A plug is provided for partial axial insertion into the hole. The plug and hole are dimensioned to produce an interference fit therebetween when the plug is inserted into the hole. The plug includes a duct normal to its longitudinal axis and dimensioned to receive the fishing line. The orientation of the duct with respect to the guide portion of the lure guide member, in part, determines the path of the fishing lure when retrieved.

BRIEF DESCRIPTION OF THE DRAWINGS

The invention will presently be described in greater detail, by way of example, with reference to the accompanying drawings, wherein:

FIG. 1 is a pictorial view of a bait-receiving lure constructed in accordance with this invention and, in which, a herring is received;

FIG. 2 is an exploded pictorial view of the bait-receiving lure illustrated in FIG. 1;

FIG. 3 is a side view of the bait-receiving fishing lure of FIG. 1 with broken lines used to illustrate the adjustment of the lure to accommodate baits of different size;

FIGS. 4A, 4B, and 4C are side views of the bait-receiving fishing lure illustrated in FIG. 1, which illustrate the manner in which the retrieval pattern of the lure can be varried;

FIG. 5 schematically depicts the various retrieval patterns that can be adjustably produced by a fishing lure constructed as shown in FIG. 1;

FIGS. 6A, 6B, and 6C are top views of the bait-receiving lure illustrated in FIG. 1, which illustrate the manner in which additional variations in the lure retrieval pattern can be accomplished;

FIG. 7 is a cross-sectional view of the bait-receiving fishing lure illustrated in FIG. 1, showing the use of a nonlinear line passage through a portion of the lure body; and FIG. 8 illustrates an alternative embodiment of the bait-receiving fishing lure illustrated in FIG. 1.

DETAILED DESCRIPTION OF THE PREFERRED EMBODIMENT OF THE INVENTION

Referring now to FIG. 1, an adjustable bait-receiving fishing lure 10 is shown engaging a bait 12 such as a herring. As will be discussed in greater deail below, lure 10 is constructed to provide a number of desirable features. For example, lure 10 adjustably receives herring 12 of different sizes, securely supporting them in a manner that minimizes damage to the herring 12 and offers good visibility. Fishing lure 10 is further adjustable to control the retrieval depth of the lure for the particular herring size and trolling speed involved, as well as the side-to-side swimming action produced by the lure upon retrieval. Finally, lure 10 is constructed to move up the line away from the hooks while a fish is being fought and remain in that position when the fish is netted.

As shown in FIG. 1, the lure 10 includes a top piece 14 and bottom piece 16 for cooperatively engaging upper and lower, forward portions of herring 12. A diving lip 18 is included to guide lure 10 downward and give it a swimming action when retrieved through the water. A screw 20 joins the top piece 14, bottom piece 16, and diving lip 18 in a continuously adjustable manner that allows lure 10 to be adjusted for use with herring 12 of different size and for retrieval at different depths with different actions. Terminal gear 22, passing through lure 10, connects the lure to the fishing line. A rotatable plug 24, frictionally and removably secured in the diving lip, maintains the desired orientation of the terminal gear 22 with respect to diving lip 18, allowing the lure action to be controlled until a fish strikes.

Addressing the various elements of lure 10 in greater detail, reference is had to the exploded pictorial view of lure 10 provided in FIG. 2. Considering first the top piece 14, as shown in FIG. 2, it includes a forward, disc-like portion 26 and a rearwardly depending, channeled portion 28. The disc-like portion 26 has a predetermined diameter d and thickness t. A hole 30, having a diameter d', is provided through the center of disc-like portion 26, normal to its flat sides.

The channeled portion 28 of top piece 14 projects rearwardly from the disc-like portion 26 and defines a downwardly directed channel 32 for receiving an upper, forward portion of the herring 12. More particularly, the channeled portion 28 includes a central region 34 that decreases in thickness as it extends away from disc-like portion 26. The central region 34 extends laterally into spaced-apart side regions 36 that project downwardly, roughly parallel to disc-like portion 26. The thickness of the side regions 36 decreases slightly with distance from disc-like portion 26 and central region 34. As a result, the width of the channel 32 increases slightly with distance from the disc-like portion 26 to more closely accommodate the body of a herring 12. The length of the side regions 36 is somewhat greater than that of central region 34 and the lower edge 38 of each side region 36 is cupped. As shown in FIG. 2, the edges and surfaces of the channeled portion 28 vary gradually to minimize abrasion to herring 12 and provide a hydrodynamic exterior.

The disc-like portion 26 and channeled portion 28 are joined such that one of the flat surfaces of the disc-like portion 26 lies in the plane bisecting the central region 34 of channeled portion 28. Both the disc-like portion 26 and channeled portion 28 of top piece 14 can conveniently be molded as a single piece from, for example, a clear thermoplastic material. A staple 40, made of stainless steel and having a pair of downwardly projecting pins 42, can be molded into the top piece 14 approximately three-fourths of the distance between the disc-like portion 26 and the end of the central region 34 of the channeled portion 28. The pins 42 are spaced-apart, in a plane normal to channel 32, a distance sufficient to cause herring 12 to be pierced on each side of its spine.

Turning now to a more detailed description of the bottom piece 16 of lure 10, bottom piece 16 roughly mirrors the top piece 14. More particularly, the bottom piece 16 includes a disc-like portion 44 and a rearwardly depending, channeled portion 46. The disc-like portion 44 preferably has a diameter d and thickness t corresponding to those of the disc-like portion 26 of top piece 14. Similarly, disc-like portion 44 is provided with a hole 48 through its center and normal to its flat surfaces. The diameter d' of hole 48 is equal to that of hole 30 in the disc-like portion 26 of top piece 14.

The channeled portion 46 of bottom piece 16 projects rearwardly from disc-like portion 44 to define an upwardly directed channel 50 that is similar to the downwardly directed channel 32 of the top piece 14, but is slightly more V-shaped in cross section. The channeled portion 46 includes a central region 52 whose thickness decreases as a function of distance from disc-like portion 44. Side regions 54 are provided on each side of central region 52 roughly parallel to the disc-like portion 44. The thickness of the side regions 54 decreases slightly with distance from central region 52 and disc-like portion 44. As a result, the width of channel 50 increases slightly with distance from disc-like portion 44 and central region 52 to closely accommodate the lower, forward portion of herring 12. The upper edges 56 of each side region 54 of the channeled portion 46 are cupped.

The lower surface of the channeled portion 46 of bottom piece 16, opposite upwardly directed channel 50, is provided with a concave depression 58 of uniform width dimensioned to receive a portion of a split ring, shown best in FIG. 1. A projection 60, provided on the lower surface of the channeled portion 46, at the front of depression 58, is also concavely slotted for receipt of a portion of the split ring. The forward surface of projection 60 is connected to concave depression 58 by a hole 62, allowing a line to pass through projection 60 and connect to the split ring.

The disc-like portion 44 and channeled portion 46 of bottom piece 16 are connected such that one face of the disc-like portion 44 lies in the plane bisecting the central region 52 of the channeled portion 46. As will be discussed in greater detail below, the disc-like portions 26 and 44 of the top piece 14 and bottom piece 16 are offset in opposite directions, allowing them to abuttingly contact when the central regions 34 and 52 of pieces 14 and 16 are aligned about a common central plane, as shown in FIG. 1. Like top piece 14, the entire bottom piece 16 can be conveniently molded as a unit from a clear thermoplastic material.

Turning now to a more detailed description of the diving lip 18, as shown in FIG. 2, diving lip 18 includes a forward, teardrop-shaped plate 64 and a pair of rearwardly depending, disc-like portions 66 and 68. As shown, the width of the forward plate 64 is smallest at the end adjacent disc-like portions 66 and 68. The length, width, and overall shape of the forward plate 64 can be varied to alter the interaction between forward plate 64 and the water, thus affecting the swimming action and retrieval depth of lure 10. For example, diving lip 18 can include a curved forward piece in place of plate 64.

In the preferred embodiment, the edge 70 of the forward plate 64 is at a 45-degree angle with respect to the upper and lower surfaces of plate 64. In this manner, a knife edge is provided at the front of forward plate 64 for greater control in the water. A hole 72 is located through forward plate 64 normal to the flat surfaces of the plate 64. Hole 72 is positioned along a line that bisects diving lip 18 at a point proximate the end of forward plate 64 that is connected to disc-like portions 66 and 68. As shown in FIG. 1, a boss 82 is provided around the perimeter of hole 72 on the lower surface of forward plate 64. Boss 82 conveniently extends the inner surface area of hole 72, allowing a more secure frictional engagement between plug 24 and the forward plate 64.

The disc-like portions 66 and 68 of diving lip 18 are secured substantially perpendicular to forward plate 64 and project rearwardly therefrom. Disc-like portions 66 and 68 each have an approximate diameter d and thickness t that correspond to the diameter d and thickness t of the disc-like portions 26 and 44 of top piece 14 and bottom piece 16, respectively. Disc-like portions 66 and 68 are spaced-apart a distance 2t, which is sufficient to cooperatively receive disc-like portions 26 and 44 therebetween.

The disc-like portion 66 of diving lip 18 is provided with a hole 74 having a diameter d' corresponding to that of the holes 30 and 62 in the disc-like portions 26 and 44 of top and bottom pieces 14 and 16, respectively. Hole 74 is additionally chamfered to receive the tapered head of flat screw 20. The other disc-like portion 68 of diving lip 18 is provided with a hole 76 that is axially aligned with hole 74 and that has a diameter d". This diameter d" of hole 76 is slightly larger than that of hole 74 and is dimensioned to receive a threaded brass insert 78.

The opening 80 defined between the disc-like portions 66 and 68 of diving lip 18 is sufficiently deep to leave a space between the diving lip 18 and the disc-like portions 26 and 44 of the top and bottom pieces 14 and 16 when holes 30, 62, 74, and 76 are axially aligned. As will be discussed in greater detail below, this opening provides a passage for the terminal gear 22 between the upper and lower portions of lure 10.

As will be appreciated, diving lip 18, like to p piece 14 and bottom piece 16, can conveniently be molded in a single piece from a clear thermoplastic material. While the brass insert 78 can also be molded into the disc-like portion 68, in a preferred arrangement, insert 78 has a roughened exterior that allows it to be ultrasonically welded in place when the adjacent plastic is temporarily ultrasonically melted and then hardened in place.

A brass flat screw 20 dimensioned to pass through clearance holes 30, 48, and 74, is threaded into cooperative engagement with the internal threads of insert 78. As will be discussed in greater detail below, screw 20 joins the top piece 14, bottom piece 16, and diving lip 18 together to define an adjustable bait-receiving cavity between the downwardly and upwardly directed channels 32 and 50.

The terminal gear 22 connects lure 10 to fishing line 86. As shown in FIG. 1, terminal gear 22 includes a swivel 84 that is preferably of the stainless steel, ball-bearing, or barrel type. The function of swivel 84 is to prevent lure 10 from twisting the fishing line 86 in th event that a fish is hooked or lure 10 becomes tangles.

One end 88 of swivel 84 is connected to the fishing line 86, while a monofilament leader 90 is secured to the other end 92. As will be appreciated, the two ends 88 and 92 of swivel 84 pivot independently of each other. Monofilament leader 90 is also connected to a split ring 94 equipped with a hook 96, which is preferably a stainless steel treble hook. A second hook 98 is connected to the first hook 96 by an extension leader 100.

As shown in FIG. 1, monofilament leader 90 passes through the hole 62 in the projection 60 on the lower surface of bottom piece 16, drawing split ring 94 up into the concave depression 58. The leader 90 then continues through the opening 80 provided between the diving lip 18 and the disc-like portions 26 and 44 of top piece 14 and bottom piece 16. Then, plug 24 determines the orientation of leader 90 with respect to diving lip 18.

As will be appreciated, plug 24 is a slightly tapered, roughly cylindrical piece, dimensioned for axial insertion into the hole 62 that is provided in the forward plate 64 of diving lip 18. The roughly cylindrical surface 102 of plug 24 is designed to frictionally engage the wall of hole 62 and boss 82. A passageway 104 is provided through plug 24 normal to its longitudinal axis and a screwdriver slot 105 is provided in the upper surface of plug 24. Passageway 104 is dimensioned to receive monofilament leader 90 and, when plug 24 is frictionally engaged within hole 62, it determines the orientation of leader 90 with respect to lure 10 at the point of attachment. As will be discussed in greter detail below, by rotating the frictionally inserted plug 245 witht he aid of a screwdriver applied to slot 105, a variety of lure 10 actions can be easily achieved.

Turning now to a discussion of the manner in which herring 12 of different size can be inserted in lure 10, reference is had to FIG. 3. As will be appreciated, screw 20 is used to assemble top piece 14, bottom piece 16, and diving lip 18 into an adjustable lure 10. By rotating screw 20 counterclockwise sufficiently to release the frictional engagement between the head of screw 20 and the chamfered surface of hole 74, the top piece 14 and bottom piece 16 can be rotated about screw 20 in opposite directions, allowing a herring 12 to be easily inserted between the downwardly and upwardly directed channels 32 and 50.

With screw 20 still loose, the top piece 14 and bottom piece 16 are rotated toward each other until the pins 42 of the staple 40 mounted in top piece 14 pierce herring 12 and the channeled portions 28 and 46 of top piece 14 and bottom piece 16 cooperatively engage forward portions of the herring 12. Screw 20 is then rotated clockwise until its head is brought into frictional engagement with the chamfered portion of hole 74, securing the disc-like portions 26 and 44 of the top and bottom pieces 14 and 16 between the disc-like portions 66 ad 68 of diving lip 18. In this manner, the herring 12 is held securely in place during fishing.

As indicated in FIG. 3, the arrangement described above allows herring 12 of various sizes to be adjustably received between the top piece 14 and bottom piece 16 of lure 10. More particularly, although lure 10 is continuously adjustable, the lure is shown adjusted for use with herring 12 of two differnt sizes in FIG. 3. As shown in solid line A, the top piece 14 and bottom piece 16 are adjusted for use with relatively small herring 12. By appropriately dimensioning the top piece 14 and bottom piece 16, this minimum adjustment can be used to effectively secure baits 12 of substantially any size. As shown in FIG. 3, the minimum adjustment is primarily limited by the abutting contact of lower and upper edges 38 and 56 of the side regions 36 and 54 of top piece 14 and bottom piece 16, respectively.

The broken line view B in FIG. 3 illustrates the adjustment of lure 10 for use with somewhat larger herring 12. As will be appreciated, top piece 14 and bottom piece 16 can be appropriately dimensioned to accept herring 12 of substantially any maximum size. Further, a particular construction of lure 10 is able to accept a relatively wide range of herring sizes. Manual adjustments to the orientation of pins 42 with respect to top piece 14 can be made to ensure that they pierce herring 12 in a direction substantially perpendicular to the herring's spine, thereby offering good bait retention.

Turning now to a discussion of the manner in which the retrieval depth and action of lure 10 are adjusted, reference is had to FIGS. 4A, 4B, and 4C. More particularly, when screw 20 has been rotated counterclockwise to adjust the spacing of top piece 14 and bottom piece 16 to receive the particular herring 12 selected, the desired orientation of diving lip 18 with respect to these pieces is simultaneously adjusted. As with the spacing of top piece 14 and bottom piece 16, the orientation of diving lip 18 is thereby made continuously adjustable.

Although diving lip 18 is constructed to normally have a downturn of approximately five degrees, the orientation of diving lip 18 with respect to lure 10 can be adjusted through a broad range. This range may extend, for example, between a point at which the forward plate 64 of the diving lip 18 lies in the same plane as the spine of herring 12, as shown in FIG. 4A, to one at which it projects substantially downward forming a 45-degree angle with the spine, as shown in FIG. 4C.

Because the flat upper surface of the forward plate 64 of diving lip 18 resists the flow of water against it, diving lip 18 effectively causes lure 10 to seek a path in the direction of diving lip 18. In addition ,the symmetric diving lip 18 provides an unstable resistance to the flow of water, causing a wobbling or swimming action to be imparted to lure 10. As will be appreciated from FIGS. 4 and 5, the farther diving lip 18 is rotated downward, the deeper lure 10 will travel when trolled or retrieved through the water at a given speed. Thus, the various adjustments shown in FIGS. 4A, 4B and 4C have an effect on the lure retrieval path that is illustrated by the corresponding views A, B, and C in FIG. 5. It will also be appreciated that the resistance of diving lip 18 to the flow of water increases as the diving lip 18 is rotated downward, imparting a more pronounced swimming action to lure 10.

Because a larger, heavier herring 12 will effectively weigh the back end of lure 10 down and elevate the diving lip 18, a greater downward correction in the adjustment of diving lip 18 is required for larger herring 12 to achieve the same lure 10 depth and lifelike action. This effect may be slightly offset, however, by the added weight of the larger herring 12. Similarly, because the force of the water against the forward plate 64 of the diving lip 18 is directly proportional to the retrieval or trolling speed of the lure 10, a greater downward correction in the adjustment of diving lip 18 is required to achieve a given lure depth and action for lower speeds.

To allow the foregoing adjustments to lure 10 to be accurately repeated for use with herring 12 of particular sizes and to repeat a desired retrieval pattern and action, indicator marks 106, shown in FIGS. 4A through 4C, are provided on one of the disc-like portions 66 or 68 of diving lip 18. With the indicator marks 106 appropriately aligned with the lower edge 38 of top piece side region 36 and the upper edge 56 of bottom piece side region 54, the desired herring 12 size, retrieval depth, and action are easily achieved.

Turning now to the manner in which the swimming action of lure 10 is adjusted, reference is had to the top view of lure 10 shown in FIGS. 6A, 6B, and 6C. As discussed previously, the portion of monofilament leader 90 extending between split ring 94 and fishing line 86 passes through the projection 60 on the lower surface of the bottom piece 16 and travels upward through the opening 80 provided between the diving lip 18 and the disc-like portions 26 and 44 of top piece 14 and bottom piece 16. Then, it extends through a passageway 104 in the plug 24, which is frictionally secured in the hole 72 provided in the forward plate 64 of diving lip 18.

Plug 24 accomplishes several functions. First, it allows the attachment orientation between the leader 90 and diving lip 18 to be continuously varied. More particularly, with plug 24 inserted into, a frictionally engaged with, the interior of hole 72 and boss 82, leader 90 can be drawn forward until split ring 94 is securely positioned against projection 60 and within the concave depression 58 provided in the lower surface of bottom piece 16. In this manner, slack is removed from the portion of leader 90 extending behind plug 24 and a relatively snug connection at diving lip 18 is provided. Then, with plug 24 positioned such that passageway 104 is substantially aligned with the vertical plane bisecting lure 10, as shown in FIG. 6A, the force exerted by the water against the forward plate 64 of diving lip 18 is essentially balanced and will cause lure 10 to wobble slightly, producing a swimming action as it is drawn through the water.

When a screwdriver is applied to the slot 105 in the uppr surface of plug 24, and plug 24 is rotated slightly, for example, to the position shown in FIG. 6B, the effective point of attachment between the monofilament leader 90 and diving lip 18 is shifted slightly upwards and to one side. Because the connection point no longer lies in the plane of bisection, the surface area of the forward plate 64 on each side of the leader becomes imbalanced. As a result, the water applies more force to the diving lip 18 on one side of the leader 90, causing a slight twist in the orientation of lure 10 with respect to the water. This causes lure 10 to traverse a somewhat helical path underneath the water as it maintains it swimming action. As will be appreciated, the magnitude of the plug's rotation influences the path traversed. The diameter of the helical path will decrease as the rotation of the plug 24 is increased from the center position shown in FIG. 6A. Continued rotation of plug 24 may ultimately produce an imbalance that is sufficient to impair the action of lure 10, causing it to twist at the end of the line rather than "swim." When plug 24 is rotated in the opposite direction, to the position shown in FIG. 6C, lure 10 again traverses a substantially helical path through the water, with the progression of the path being effectively reversed from that produced by rotation of the plug as shown in FIG. 6B. Because plug 24 is typically frictionally engaged within hole 72, the rotational adjustment of plug 24 as outlined above is most easily accomplished with the aid of a screwdriver applied to the slot 105 located in the upper surface of plug 24.

Addressing now the second feature of plug 24, it is helpful first to consider the occurrence of a strike by a fish upon lure 10. More particularly, the fish exerts a force on one of the hooks 96 or 98 that is counterbalanced by the force applied by a fisherman to fishing line 86. The resultant tension in monofilament leader 90 causes the leader 90 to act as a lever against the portion of diving lip 18 adjacent the slot 80 between disc-like plates 66 and 68, exerting an upward force on plug 24 and dislodging it.

As will be appreciated, if lure 10 is made of a buoyant material, it is then free to float up the line away from hooks 96 and 98 and the fish. In this manner, lure 10 no longer provides a leverage point for the fish to use to pull hooks 96 and 98 free. Further, by appropriately selecting the relative tensile strengths of fishing line 86 and monofilament leader 90, leader 90 will break if hooks 96 and 98 become snagged, allowing lure 10 to float to the surface where it can be retrieved by the fisherman. Thus, the lure 10 is not easily lost by the fisherman.

In an alternative arrangement, shown in FIG. 7, monofilament leader 90 passes through a slightly S-shaped passage 108 in the diving lip 8. The operation of lure 10 is essentially the same as described above where a straight passage is used, with the following exception. As will be appreciated, when plug 24 is pulled free of the hole 72 in the forward plate 64 of diving lip 18, tension in the monofilament leader 90 exerts frictional forces against the curved walls of passage 108. As a result, the position of lure 10 with respect to leader 90 is maintained while the leader 90 is under tension. When a fish is being fought, the frequent variations in leader 90 tension, combined with the buoyant nature of lure 10, allow lure 10 to work its way up leader 90. When the fish is landed, however, the tension in the line maintains lure 10 spaced apart from hooks 96 and 98, thereby reducing entanglement in the net.

With plug 24 assembled, baited, and adjusted to produce the desired retrieval characteristics as described above, the lure 10 is ready to be used for fishing. As will be appreciated, the top piece 14 and bottom piece 16 securely engage the herring 12 while maintaining good visibility. In this regard, the curved lower and upper edges 38 and 56 of side regions 36 and 54 enhance visibility, particularly with respect to the eye of the herring 12. Similarly, by molding top piece 14, bottom piece 16, and diving lip 18 out of a clear thermoplastic material, the lure 10 offers herring 12 in a highly visible manner.

The dimensions of the side regions 54 of the bottom pice 16 are selected in connection with the particular hook 96 size to prevent the hook from catching on the side regions 54. In that regard, the location of the concave depression 58 provided in the lower surface of bottom piece 16 is designed to prevent the hook 96 associated with split ring 94 from catching at the end of bottom piece 16. The beveled surfaces and smooth contours of top piece 14 and bottom piece 16 minimize damage to herring 12, allowing it to be used for greater periods.

While various constructions of lure 10 can be employed, on alternative embodiment is depicted in FIG. 8. As shown, a pair of side sections 110 and 112 are employed to cooperatively engage the sides of the herring 12. The diving lip 114 includes a forward plate 116 and disc-like plate 118. Resilient pads 120 are provided on each side of disc-like plate 118 and a screw 122 extends through the side sections 110 and 112, the disc-like plate 118, and resilient pads 120. As will be appreciated, when a bait is inserted between the side sections 110 and 112, screw 122 can be tightened to securely hold a herring 12 in place, with the compressibility of the resilient pads 120 offering some range of adjustment in the spacing between side sections 110 and 112. In another alternative embodiment, lure 10 is constructed in substantially the same manner as that depicted in FIG. 8 except that side sections 110 and 112 are joined at their forward ends to form a single piece.

Those skilled in the art will recognize that the embodiments of the invention disclosed herein are exemplary in nature and that various changes can be made therein without departing from the scope and the spirit of the invention. In that regard, the construction of top piece 14 and bottom piece 16 can be varied for use with different types of bait 12. Further, it will be recognized that side-to-side, as well as vertical arrangements, can be employed to secure the bait in lure 10. Because of the above and numerous other variations and modifications that will occur to those skilled in the art, the following claims should not be limited to the embodiments illustrated and discussed herein.

The embodiments of the invention in which an exclusive property or privilege is claimed are defined as follows:

1. An adjustable fishing lure, for interacting with water in various manners, comprising:
   a lure body;
   a lure guide member for cooperatively interacting with the water through which said fishing lure is drawn; and
   means for rotatably, continuously, adjustably connecting said body and said guide member, allowing the interaction between said guide member and the water to be varied.

2. The adjustable fishing lure of claim 1, wherein said lure guide member comprises a pair of lure assembly portions, spaced apart to receive said lure body therebetween, and a guide portion, to which the resistive force of the water is applied as the lure is drawn through the water, the depth at which said lure travels through the water being a function, in part, of the orientation of said guide portion with respect to said body.

3. The adjustable fishing lure of claim 2, wherein said means for adjustably connecting said guide member and said body comprises a screw passing transversely through said body and said lure assembly portions of said guide member.

* * * * *